United States Patent

[11] 3,578,021

| [72] | Inventor | August Milo |
| | | 1015 Schliefer Drive, Hillside, N.J. 07205 |
| [21] | Appl. No. | 887,524 |
| [22] | Filed | Dec. 23, 1969 |
| [45] | Patented | May 11, 1971 |

[54] FROST HEAVE-RESISTANT PUMP INLET ASSEMBLY
3 Claims, 3 Drawing Figs.

| [52] | U.S. Cl. | 137/515, 137/369 |
| [51] | Int. Cl. | F16l 27/12 |
| [50] | Field of Search | 137/514, 369, 370, 515; 251/144, 147, 150 |

[56] References Cited
UNITED STATES PATENTS

| 621,448 | 3/1899 | Dwyer | 137/370 |
| 2,662,548 | 12/1953 | Pryor | 137/515 |
| 2,827,914 | 3/1958 | Alters | 137/370 |
| 3,297,050 | 1/1967 | Rider | 137/369 |
| 3,442,288 | 5/1969 | Scaramucci | 137/515 |

*Primary Examiner*—Laverne D. Geiger
*Assistant Examiner*—William H. Wright
*Attorney*—Peter J. Gaylor ABSTRACT: A frost heave-resistant inlet assembly for a pump designed for pumping inflammable liquid, and disposable above the ground, and connectable to a tank outlet disposed underground, consists in a sleeve, the lower portion of which is connected in sealed sliding relation to the tank outlet. The sleeve is extendable over the tank outlet for a distance adequate to accommodate the tank outlet in the event of a frost heave causing the outlet to rise above the ground. A coupling is connected over the upper portion of the sleeve in outside sealable relation, and it has an inwardly projecting circumferential lip having a bevel on its lower portion. A valve section, having a lower nipple portion and an upper portion, and having a seating means on its upper portion, has a valve mounted therein, the valve being seatable on the seating means when the pump is idle, and being in raised position when the pump is running. The nipple portion of this valve section has a circumferential groove and a broken ring is seated in the groove and projecting out of it so as to serve as locking means for the beveled edge of the coupling. A connecting means, such as a coupling, is mounted on the upper portion of the valve section to connect it in outside sealing relation with the pump inlet.

PATENTED MAY 11 1971 3,578,021

FLOW

TO TANK

INVENTOR.
AUGUST MILO
BY
ATTORNEY

FROST HEAVE-RESISTANT PUMP INLET ASSEMBLY

BACKGROUND OF THE INVENTION

The present invention deals with a pump inlet assembly which is resistant to frost heaves and which prevents snapping off of nipples leading to an underground gasoline storage tank, for example, during extreme cold conditions. Pump inlet shear grooves have been used in the prior art with turbine pump installations wherein the gasoline is pushed out of the tank by the submersible pump, and the lines are under pressure at all times. Such shear grooves facilitate cold conditions. However, when this occurs, an open pipe is present which involves serious safety hazards until the shutdown condition is remedied.

SUMMARY OF THE INVENTION

According to the present invention, which deals with a vacuum system disposed above the ground, the snapping off of a pipe or nipple in the event of a frost heave is averted or prevented by the use of a sleeve the bottom of which is attached, in sealed sliding relation, to the gasoline tank outlet, while its upper portion is coupled, in locked sealing relation, to the lower nipple end of the valve section of the unit. The coupling has an inwardly directed lip which seats on a split ring anchored into and projecting out of a circumferential groove in the nipple portion. The valve section has a valve, such as a spring-biased poppet valve, mounted therein which seats on the upper end of the valve section when the pump is idle, and is lifted up from the seat when the gasoline is being sucked up into the pump inlet and then pumped out of the dispensing nozzle. The upper portion of the valve section is connected, in outside sealing relation, to the pump inlet.

BRIEF DESCRIPTION OF THE DRAWINGS

The invention will be more readily understood by reference to the accompanying drawings in which a preferred embodiment is described, and in which.

The same numerals refer to similar parts in the various FIGS.

DESCRIPTION OF THE PREFERRED EMBODIMENTS

Figure 1:
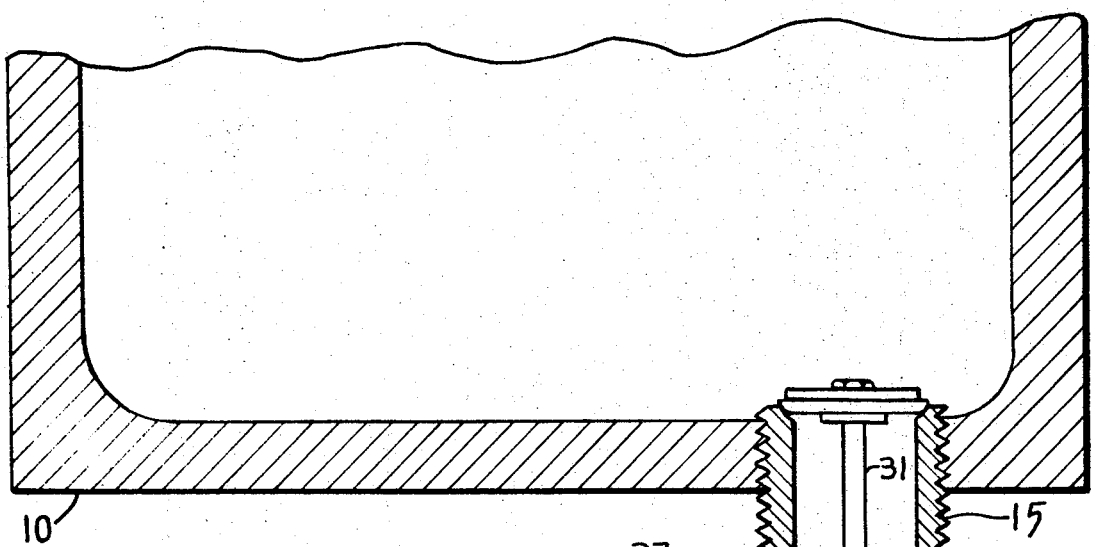
FIG. 1 depicts an elevational side view, partly broken away and in cross section, of a preferred embodiment of the invention.

Referring to the drawings, numeral 10 indicates generally the pump suction section, while numeral 11 refers generally to the valve section, and numeral 12 refers generally to the slide nipple and sleeve section of the invention.

The entire unit of the present invention is situated above the ground, and usually within the dispenser stand from which gasoline or other liquid is dispensed. The unit is connected directly at the bottom (inlet) end of the gasoline pump via connecting thread 15.

The lower nipple portion 19 of valve section 11 has a circumferential groove 16, in which groove is inserted a round, spring wire split ring 17, which becomes anchored in the groove. Union coupling 18, which is locked onto nipple portion 19 of valve section 11 by ring 17, has an inner lip 20 having a beveled edge at its bottom. This edge fits over ring 17 in locking relation when union coupling 18 is tightened onto the upper threaded end of sleeve 21. Nipple 22, which is slidably disposed within sleeve 21, is attached to the gasoline tank outlet.

Inserted against shoulder 23 inside the top of sleeve 21 is a resistant gasket 24 contained partially in steel retainer ring 25. As coupling 18 is tightened, it compresses gasket 24 against the walls of nipple portion 19 and the inner wall of sleeve 21 to make a leakproof joint. Similarly, a gasket 26 inside the lower end of sleeve 21 makes a leakproof joint between the sleeve and nipple 22 when the gasket is compressed against shoulder 27 when coupling 28 is tightened.

Figure 3:
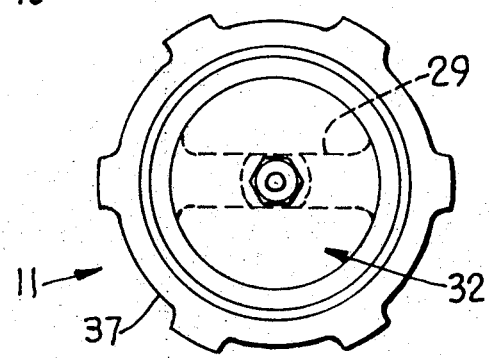
FIG. 3 shows a top or plan view of the valve section presented in FIG. 2.
Figure 2:
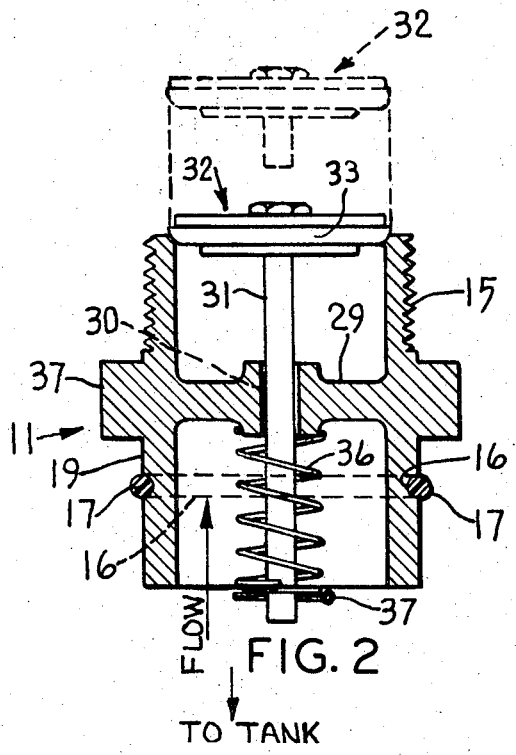
FIG. 2 illustrates a cross-sectional side view of the valve section of the assembly shown in FIG. 1.

As can be seen from FIGS. 2—3, valve section 11 has a diametrically and centrally disposed crossmember 29 with a central opening 30, in which rides rod 31, and on which is mounted poppet valve 32. The latter has a gasoline-resistant gasketed bottom portion 33 which seats in sealing relation on beveled edge 34 of wall 15. Below crossmember 29, a helical spring 36 is mounted around rod 31, and is held in tensed condition by cotterpin 37, in a manner such that the poppet valve 32 is maintained in liquid-sealing condition when the gasoline pump is not in operation. However, when the gasoline pump is running, the flow of gasoline through section 11 (in the direction of the arrow), causes the poppet valve to open, as shown in the broken lines in FIG. 2, against the force of spring 36. A broken projecting circumferential portion 37 is provided around the body of section 11 to enable turning it with a wrench, when desired. Coupling 18 may be removed from section 11 by lifting ring 17 (which is broken at 38), out of groove 16, and sliding it off nipple portion 19.

In the event of a frost heave, nipple 22 rises or lowers and slides within sleeve 21, and no damage results. This prevents breakage of nipple 22 at threads 39, or at the threaded portion 15 of the valve, which would occur otherwise, had sleeve 21 not been present. With an arrangement of the present invention, it is possible to take care of frost heaves resulting in movements as much as 3½ inches to even 5 inches or more, of nipple 22.

The purpose of valve 32 is to maintain liquid in the entire line after the pump has stopped. Otherwise, the pump would be pumping air and would necessitate priming.

The present invention also may be used with a valve without stem, spring and cotterpin to serve as a telescopic fitting when a foot valve is used in the tank or when an angle check valve is employed on top of the tank, when the latter is disposed underground, and is covered with earth. It then serves to eliminate breakage of the threaded end of the suction pipe, nipple or union, if these were used for connection with the pump.

I claim:

1. A frost heave-resistant inlet assembly for a pump designed for pumping inflammable liquid, and disposable above ground, and connectable to a tank outlet disposed underground, comprising:

a sleeve having its lower portion disposable in sealed sliding relation over said tank outlet, said sleeve being extendable over said tank outlet for a distance adequate to accommodate said tank outlet in the event of a frost heave causing the ground to rise and then to settle, a coupling connectable over the support portion of said sleeve in sealable relation, and having an inwardly projecting circumferential lip having a bevel on its lower portion, a valve section having a lower nipple portion and an upper portion, and having seating means on said upper portion, and having a valve mounted therein with said valve seatable on said seating means when said pump is idle, and in raised position above said seat when said pump is running, a circumferential groove disposed around said nipple portion of said valve section, a broken ring seatable in and projectable out of said groove and serving as locking means for said beveled edge of said coupling disposable thereabove, when said coupling is tightened in sealable relation over said nipple portion, and connecting means disposable on the upper portion of said valve section and designed to connect said valve section in outside sealing relation to said pump inlet.

2. A frost heave-resistant inlet assembly for a pump, according to claim 1, wherein said valve is a spring-biased poppet valve.

3. A frost heave-resistant inlet assembly for a pump, according to claim 1, wherein the upper portion of said valve section is threaded on the outside, and said connecting means is a coupling.